United States Patent [19]

Hile et al.

[11] 3,837,905

[45] Sept. 24, 1974

[54] THERMAL OXIDATION OF SILICON

[75] Inventors: John W. Hile, Birmingham; Mao-Chieh Chen, Sterling Heights, both of Mich.

[73] Assignee: General Motors Corporation, Detroit, Mich.

[22] Filed: Aug. 14, 1972

[21] Appl. No.: 280,490

Related U.S. Application Data

[63] Continuation-in-part of Ser. No. 182,586, Sept. 22, 1971, abandoned.

[52] U.S. Cl. ................. 117/201, 117/212, 117/217, 117/227, 117/118, 148/1.5 R, 148/191, 252/372, 252/373

[51] Int. Cl. ......................... C23c 11/00, B44d 5/12

[58] Field of Search ............ 117/201, DIG. 12, 212, 117/217, 227, 118; 148/1.5 R, 191; 252/372, 373

[56] References Cited

UNITED STATES PATENTS

| | | | |
|---|---|---|---|
| 3,100,728 | 8/1963 | Vullo | 148/6.15 R |
| 3,290,570 | 12/1966 | Cunningham | 117/217 |
| 3,556,880 | 1/1971 | Heiman | 148/187 |
| 3,558,352 | 1/1971 | Cartrucci | 117/217 |
| 3,562,604 | 2/1971 | Van Laer | 117/212 |
| 3,647,535 | 3/1972 | Naber | 117/212 |
| 3,687,718 | 8/1972 | Morrison | 117/212 |

*Primary Examiner*—Ralph S. Kendall
*Assistant Examiner*—Michael F. Esposito
*Attorney, Agent, or Firm*—Robert J. Wallace

[57] ABSTRACT

Silicon dioxide is thermally grown on a silicon surface in an oxygen atmosphere containing trichloroethylene ($C_2HCl_3$) vapor. Smaller concentrations of trichloroethylene provide clean oxide layers. Significantly larger concentrations provide an oxidation rate increase. Metal-oxide-semiconductor (MOS) devices can be produced having an initially low oxide space charge and an improved electrical stability under bias-temperature stress.

7 Claims, 4 Drawing Figures

THERMAL OXIDATION OF SILICON

RELATED PATENT APPLICATION

This application is a continuation-in-part of U.S. Pat. application Ser. No. 182,586, filed Sept. 22, 1971, now abandoned in the names of John W. Hile and Mao-Chieh Chen, and assigned to the assignee of this invention.

BACKGROUND OF THE INVENTION

This invention relates to the preparation of oxide coatings on silicon. More particularly it concerns an improved thermal oxidation technique which provides a high quality silicon oxide coating that is especially suitable for metal-oxide-semiconductor (MOS) devices. It also concerns a technique for accelerating the rate of silicon oxidation with dry oxygen.

Surface states, surface charges and space charges in the oxide affect the electrical characteristics of a MOS device. Not only do they reduce initial performance but degrade reliability and induce instabilities. In addition, they make it difficult to consistently make MOS devices of precisely defined characteristics. For example, space charges in the oxide due to alkaline ion contamination, shift the flat band voltages. These ions act as mobile space charges. Hence, they not only produce an initial shift in flat band voltage but can subsequently cause it to vary uncontrollably as they move about. If this contamination is not controlled during oxide growth, the electrical characteristics of resultant MOS devices are less than ideal, are not precisely predictable, and subsequently vary with use.

Techniques have already been developed to reduce the positive ion space charge in thermal oxide layers with varying degrees of success. Among the techniques employed include the use of phosphosilica layers, and the production of clean oxides by gaseous etching of the silicon with HCl and immediately successive oxidation with radio frequency induction heating. In addition, clean oxides have been produced by including HCl vapor in the thermal oxidation atmosphere. The inclusion of HCl vapor in the thermal oxidation atmosphere is one of the more successful techniques for obtaining more ideal flat band voltages and insuring that they will not appreciably change under electrical bias-temperature stress.

However gaseous HCl, chlorine, and the like, require special handling and apparatus, because of their toxic and/or corrosive character. Special storage rooms and handling techniques may be required for these gas sources, as well as the more expensive noncorrosive metals in valves, tubing, fittings, etc., in distribution systems.

We have found a technique for producing exceptionally high quality thermal oxide coatings on silicon without using corrosive gas sources. Moreover, our technique permits one to consistently form MOS devices with precisely predictable characteristics that are not only initially close to ideal but remain substantially so after periods of electrical bias-temperature stress. In addition, we have found a technique for increasing the rate at which dry oxygen oxidizes silicon.

OBJECTS AND SUMMARY OF THE INVENTION

It is, therefore, an object of the invention to provide improved processes for growing thermal oxides on silicon. Another object of the invention is to provide a simple and reliable technique for consistently obtaining precisely predetermined characteristics in MOS devices. A further object of the invention is to provide an improved oxidation atmosphere for producing thermal oxides. A still further object is to provide a technique for increasing the rate at which dry oxygen oxidizes silicon. These and other objects of the invention are attained by including trichloroethylene ($C_2HCl_3$) in the oxygen atmosphere used for thermal oxidation. Trichloroethylene concentrations as low as about 10 parts per million parts oxygen can be used to obtain clean oxides with this invention. Concentrations greater than about 1,000 parts trichloroethylene per million parts dry oxygen produce an increase in oxidation rate over dry oxygen alone.

BRIEF DESCRIPTION OF THE DRAWING

Other objects, features and advantages of the invention shall become more apparent from the following description of preferred examples thereof and from the drawing, in which.

DESCRIPTION OF THE PREFERRED EMBODIMENTS

Figure 1:
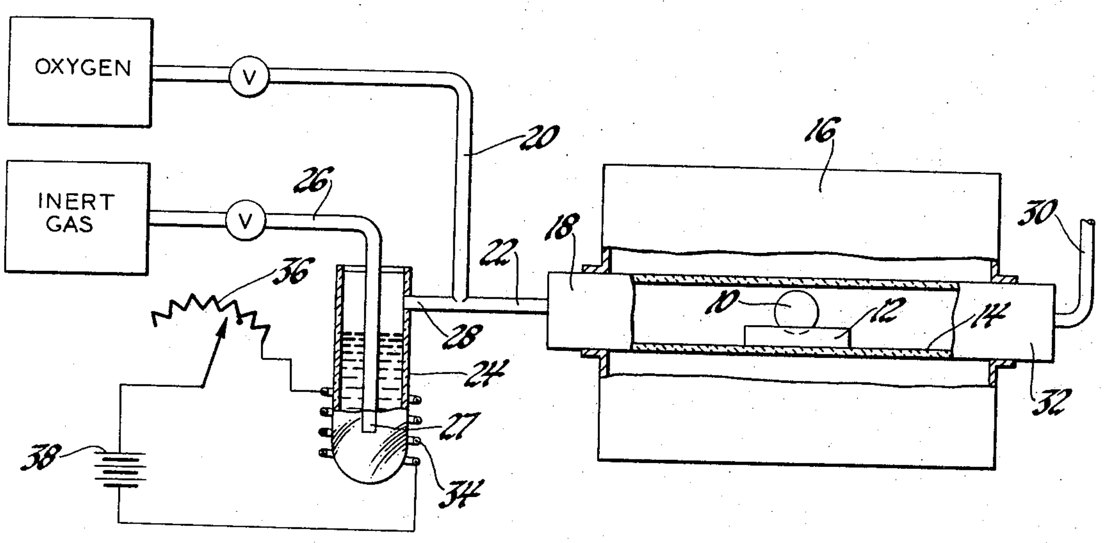
FIG. 1 shows a thermal oxidation apparatus adapted to oxidize silicon wafers in accordance with this invention.

The process of this invention can be carried out in any apparatus conventionally used for thermal oxidation. One need merely provide means for adding trichloroethylene to the thermal oxidation atmosphere. For example, as can be seen in FIG. 1, a silicon wafer 10 is positioned in a quartz holder 12 within quartz tube 14 of furnace 16. A source of oxygen communicates with the inlet end 18 of furnace tube 14 via conduits 20 and 22 to supply dry oxygen for the oxidation process. A source of inert gas communicates with a bubbler 24 through conduit 26. Bubbler 24 is filled with trichloroethylene to provide a column height of about 3 inches above the open end 27 of conduit 26. A short conduit 28 leads from bubbler 24 to conduit 22. The inert gas exiting the bubbler 24 is thus mixed with the oxygen before furnace entry. Valves are provided in conduits 20 and 26, respectively, to regulate gas flow. A conduit 30 is provided on the outlet end 32 of furnace tube 14 so that the tube can be safely and adequately exhausted of gases exiting the furnace tube. A heater 34 surrounding bubbler 24 is connected through a rheostat 36 to a source of electrical power 38. Thus, the temperature, or more importantly the vapor pressure, of the trichloroethylene in bubbler 24 can be precisely controlled.

In treating a silicon wafer in accordance with this invention one need only use the normal and accepted practices for wafer and furnace cleanliness. No special precautions are needed. For example, a high quality MOS diode can be made as hereinafter described. We prefer to use a silicon wafer which is a 0.10 ohm centimeter silicon substrate having a 30 ohm centimeter N-type epitaxial layer thereon, and a crystal orientation of [111]. The wafer should be degreased in trichloroethylene and acetone, and then rinsed in ultrasonically agitated, flowing, deionized water for 10 minutes. It can be dried with a dry nitrogen blast and then loaded into the furnace tube 14 for oxidation. Preferably, the furnace tube is already at the desired oxidation temperature when the wafers are loaded into it. While we prefer to use a furnace temperature of about 1,100°C., any of the usual thermal oxidation temperatures, e.g., about 1,050° – 1,250°C., can be used.

As soon as the wafers are loaded into the furnace, a flow of dry oxygen is commenced, at a rate of 1.5 liters per minute. The inert gas flow is concurrently started, and adjusted to a rate of 50 cc. per minute. For producing a furnace atmosphere containing about 10 parts trichloroethylene per million parts oxygen, the trichloroethylene in bubbler 24 is maintained at room temperature. As the inert gas passes through the trichloroethylene it picks up a small quantity of it. The inert gas and trichloroethylene are then mixed with the oxygen and carried into the furnace tube for reaction. If one is using dry oxygen for oxidation instead of wet or moistened oxygen, he can increase the rate of oxidation with dry oxygen by increasing the trichloroethylene concentration in the oxygen several orders of magnitude. Trichloroethylene concentrations in excess of 10 parts per million parts oxygen can be produced by heating the bubbler 24. It is, therefore, recognized that the trichloroethylene in bubbler 24 can be at temperatures above and below room temperature depending upon the concentration of trichloroethylene desired in the furnace atmosphere, and the rate of inert gas flow through the bubbler.

The wafer is then left in the hot furnace while the flow of oxygen, inert gas and trichloroethylene is continued until a predetermined thickness of oxide is formed on the silicon wafer. For furnace atmospheres containing 10 parts trichloroethylene per million parts furnace atmosphere, the rate of oxide growth appears to be normal. Hence, for an oxide thickness of about 1,500 angstroms. one should oxidize for about 75 minutes. However, for higher concentrations of trichloroethylene, as hereinafter described, the growth rate is accelerated.

After oxidation the wafer is removed from the furnace, cooled, and a plurality of 26 mil diameter aluminum dots applied to the oxide film on one face by vacuum evaporation and photo-masking. The opposite face is stripped of any oxide, and discrete MOS devices diced out of the wafer. The individual dies can then be soldered to TO-5 headers, and leads ultrasonically bonded to the gate electrodes in the usual manner.

Figure 2:
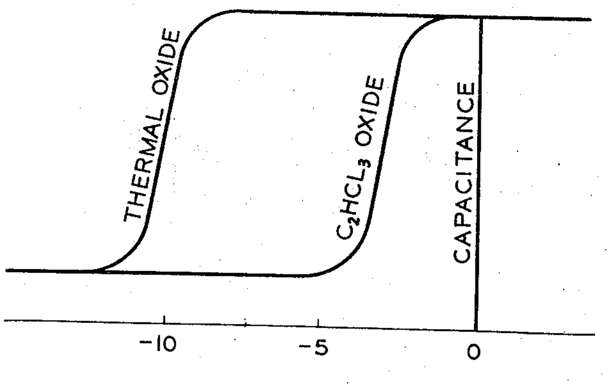
FIG. 2 shows a graph comparing a MOS diode having a conventional thermal oxide with a MOS diode produced in accordance with this invention.
Figure 3:
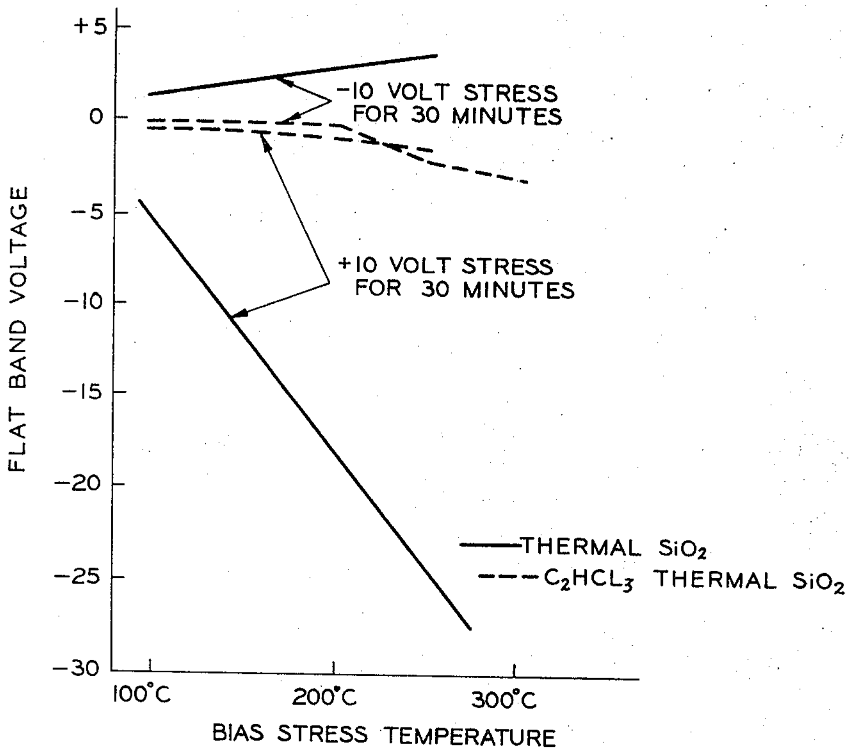
FIG. 3 shows a graph comparing the results of electrical bias-temperature stress tests on MOS diodes made with conventional thermal oxides and thermal oxides of this invention.

The significant improvement in flat band voltage attributable to clean oxides from this invention is shown in connection with FIGS. 2 and 3. FIG. 2 is a C(V), or capacitance vs., voltage, curve for an N-type silicon MOS device at 1 MHz. MOS devices made with conventional thermal oxides characteristically have the flat band voltage significantly shifted to a high negative voltage. MOS devices of this invention made in the manner hereinbefore described have flat band voltages that are less than half of those with conventional oxides. As previously indicated, this flat band voltage is not only closer to the ideal when initially made but it does not readily drift under electrical bias-temperature stress. FIG. 3 shows temperature as an abscissa and flat band voltage at 1 MHz as the ordinate in plotting results of electrical bias-temperature comparative testing. The flat band voltage drift after subjecting conventional thermal oxide MOS devices and those made in accordance with this invention to the stated electrical bias at the temperature indicated is plotted. As can be seen, the flat band voltages of conventional thermal oxide MOS devices drift considerably, while those of the MOS devices of this invention remain fairly constant. It is to be observed in connection with the latter that both positive and negative bias-temperature stress causes the flat band voltage to shift in the negative bias direction. Moreover, a slight broadening of the C(V) curve is also observed with this small increase in flat band voltage.

The important consideration in this invention resides in the addition of a small percent of trichloroethylene to the oxidation atmosphere. It can be carried into the furnace with a neutral gas such as helium or argon in the manner described, or with the oxygen itself. Moreover, the trichloroethylene could be provided in other ways. For example, it can be vaporized in a special container through which oxygen flows to the furnace. For lower trichloroethylene concentrations we prefer use of the inert gas as a carrier because it provides convenient and precise concentration control. For the higher trichloroethylene concentrations, such as shown in connection with FIG. 4, we prefer to omit the neutral gas and pass the oxygen directly through a trichloroethylene vaporization chamber. Auxiliary heating means can be used between the trichloroethylene vaporization chamber and the furnace to preclude trichloroethylene condensation before it enters the furnace. It is also to be understood that the rate of flow of oxygen can be varied and that the rate trichloroethylene is added should be adjusted accordingly. However, we have found that for a furnace tube cross-sectional area of about 0.8 square inch, a rate of flow of about 1 to 1½ liters per minute of oxygen is preferred.

As previously indicated, if one only wants a clean oxide and is not interested in an accelerated oxidation rate, it is desirable to maintain a trichloroethylene-to-oxygen ratio of the order of 10 parts per million, respectively. We prefer to use an atmosphere containing 1 part trichloroethylene to $1.0 = 10^5$ parts dry oxygen. Higher concentrations of trichloroethylene do not appear to further enhance the cleanliness of the oxide. On the other hand, if the trichloroethylene concentration is increased several orders of magnitude a new and different effect is observed. The oxide growth rate is not only accelerated but accelerated as a function of trichloroethylene concentration. Moreover, the enhanced oxide cleanliness is retained, with a small decrease in oxide stability.

Figure 4:
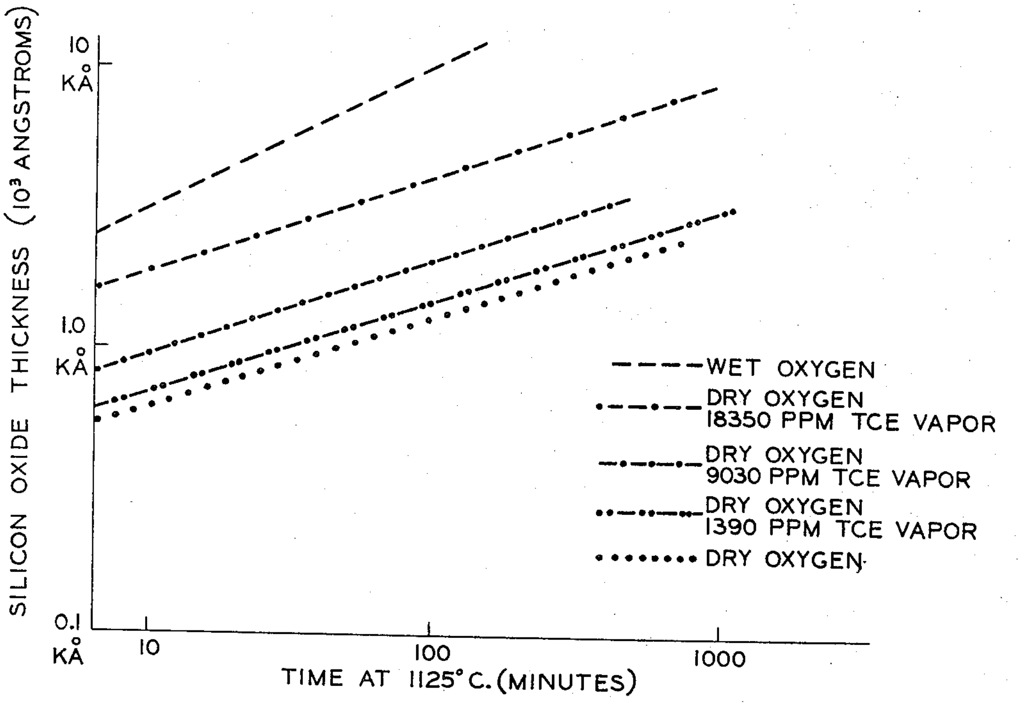
FIG. 4 shows a graph comparing the rate of oxidation on silicon for various oxygen atmospheres both with and without trichloroethylene.

FIG. 4 shows a comparison of the rates of oxidation at 1,125°C. with 1.5 liters per minute wet and dry oxygen, as well as with different concentrations of trichloroethylene in dry oxygen under otherwise identical conditions. With trichloroethylene concentations as low as 1,390 parts per million parts of dry oxygen, a distinct increase in oxidation rate is obtained. Lesser concentrations of trichloroethylene will apparently provide an oxidation rate increase for dry oxygen, but the increase is not as noticeable. At 9030 parts trichloroethylene per million parts dry oxygen the oxidation rate increase is more significant. When over 18,350 parts trichloroethylene per million parts dry oxygen are used, the oxidation rate approaches that of wet oxygen. Concentrations in excess of 20,000 parts trichloroethylene per million parts oxygen may provide even higher oxidation rates but at an increasing risk of adverse side effects.

The exact mechanism by which the trichloroethylene vapor acts in the oxidation environment to provide the improvements noted is not precisely known. It appears to reduce oxide charge by acting as a gettering agent for sodium and other ionic contaminants during the oxidation process. The trichloroethylene may decompose to release chlorine, which in turn reacts with the ionic contaminants to form volatile chlorides that are flushed from the furnace as an exhaust. In addition, there may be a chemical reaction occurring which modifies the oxide structure. This is evidenced by the observed shift in the C(V) curve. In any event, clean oxides can in fact be produced with even minor amounts of trichloroethylene in dry oxygen, and oxidation rate can, in fact, be increased with substantially larger amounts.

A final thought is that since the trichloroethylene may be decomposing, it might produce noxious or toxic substances, such as phosgene, particularly if insufficient oxygen is present. Hence, oxygen flow should always be started first and one should be sure that the furnace is safely vented.

We claim:

1. A method for thermally oxidizing the surface of a silicon wafer, said method comprising preparing a silicon wafer for oxidation, flowing over said wafer a gaseous mixture containing oxygen and about 10 – 20,000 parts trichloroethylene per million parts oxygen, and heating said wafer to a temperature of about 1,050° – 1,250°C. while flowing said gaseous mixture thereover to produce a silicon dioxide coating of predetermined thickness on said wafer.

2. A method for thermally oxidizing a silicon wafer surface which comprises preparing said wafer surface for oxidation, flowing over said wafer an oxygen atmosphere of the order of 10 parts trichloroethylene per million parts oxygen, and heating said wafer to a temperature of about 1,050° – 1,250°C. while flowing said atmosphere over it for a sufficient duration to form a high purity silicon dioxide coating of predetermined thickness on it.

3. A method for producing a high quality silicon oxide coating suitable for metal-oxide-semiconductor devices which comprises preparing a silicon wafer surface for oxidation, placing said silicon wafer in a furnace tube, flowing a dry oxygen atmosphere containing a small percent of trichloroethylene through said furnace tube, the oxygen-to-trichloroethylene ratio being about $1.0 = 10^5:1$, respectively, heating said wafer to a temperature of about 1,050° – 1,250°C. while continuously flowing said atmosphere through said furnace tube, and continuing to heat said wafer while flowing said atmosphere through said tube to produce a high quality silicon oxide coating of predetermined thickness.

4. The method of making a MOS device which comprises preparing a silicon wafer surface for oxidation, placing said silicon wafer in a furnace tube for oxidation, flowing a dry oxygen atmosphere containing trichloroethylene through said tube at a rate of about 1 – 1.5 liters per minute for each 0.8 square inch of furnace tube cross-sectional area, bubbling an inert gas through room-temperature trichloroethylene at a rate of 50 cc. per minute for each 1 – 1.5 liter of said oxygen, adding said inert gas to said oxygen atmosphere before it passes over said silicon wafer, heating said wafer to a temperature of about 1,050° – 1,250°C., continuing said heating while flowing said gases over said wafer until a silicon oxide coating of predetermined thickness is formed on at least one face of said wafer, cooling the oxide coated wafer, applying an ohmic contact to an opposite face of said wafer, and applying a counterelectrode to said coating on said one face.

5. An atmosphere for thermally oxidizing silicon to form a high purity oxide thereon which consists essentially of dry oxygen and about 10 – 20,000 parts trichloroethylene per million parts oxygen.

6. A method for accelerating the thermal oxidation of silicon with dry oxygen, said method comprising the steps of mixing dry oxygen and vapors of trichloroethylene, the concentration of said trichloroethylene in said dry oxygen being in excess of about 1,000 parts trichloroethylene per million parts oxygen, passing said mixture over a silicon surface, and heating said silicon surface to a temperature of about 1,050° – 1,250°C. while continuously flowing said gaseous mixture thereover for a sufficient duration to produce a silicon dioxide coating of predetermined thickness thereon.

7. A method for oxidizing a silicon wafer with dry oxygen at an accelerated rate which comprises preparing a silicon wafer surface for oxidation, flowing over said wafer surface a gaseous mixture containing oxygen and about 1,000 – 20,000 parts trichloroethylene per million parts oxygen, and heating said wafer to a temperature of about 1,050° – 1,250°C. while flowing said atmosphere over said wafer for a sufficient duration to form a silicon dioxide coating of predetermined thickness on said wafer surface.

* * * * *

PO-1050
(5/69)

UNITED STATES PATENT OFFICE
CERTIFICATE OF CORRECTION

Patent No. 3,837,905 Dated September 24, 1974

Inventor(s) John W. Hile and Mao-Chieh Chen

It is certified that error appears in the above-identified patent and that said Letters Patent are hereby corrected as shown below:

Column 4, line 48, "$1.0 = 10^5$ parts" should read -- $1.0 \times 10^5$ parts --.

Column 6, line 3, "about $1.0 = 10^5$:1" should read -- about $1.0 \times 10^5$:1 --.

Signed and sealed this 26th day of November 1974.

(SEAL)
Attest:

McCOY M. GIBSON JR.
Attesting Officer

C. MARSHALL DANN
Commissioner of Patents